United States Patent [19]

Moylan

[11] Patent Number: 4,832,882
[45] Date of Patent: May 23, 1989

[54] METHOD OF REMOVING IMPURITIES FROM A MATERIAL

[75] Inventor: William P. Moylan, Conyers, Ga.

[73] Assignee: Synthetics International Corp., Southport, Conn.

[21] Appl. No.: 927,842

[22] Filed: Nov. 6, 1986

[51] Int. Cl.$^4$ ............................................. B29C 47/92
[52] U.S. Cl. ...................................... 264/39; 210/741; 210/780; 264/40.1; 264/141; 264/169; 264/176.1; 425/185; 425/190
[58] Field of Search ............... 264/37, 39, 38, 40.1, 264/141, 142, 176.1, 169; 425/135, 136, 185, 190, 227, 228, 232, 225; 210/741, 780, 806, 808

[56] References Cited

U.S. PATENT DOCUMENTS

| | | | |
|---|---|---|---|
| 2,454,653 | 11/1948 | Kamp | 210/741 |
| 2,658,059 | 11/1953 | Peters et al. | 260/94.9 |
| 2,957,849 | 10/1960 | Kennedy | 260/45.95 |
| 3,459,840 | 8/1969 | Wood | 264/176.1 |
| 3,627,131 | 12/1971 | Goodman et al. | 210/741 |
| 3,804,758 | 4/1974 | Cooper et al. | 210/741 |
| 3,957,637 | 5/1976 | Morey | 210/808 |
| 4,177,234 | 12/1979 | Lowry | 264/141 |
| 4,439,325 | 3/1984 | Blais | 210/806 |
| 4,482,461 | 11/1984 | Hindman et al. | 210/741 |

Primary Examiner—Jan H. Silbaugh
Assistant Examiner—Hubert C. Lorin
Attorney, Agent, or Firm—Perman & Green

[57] ABSTRACT

A waste recovery method for producing essentially pure thermoplastic material from waste thermoplastic material containing impurities is disclosed to be comprised of an extruder, primary and secondary filtes, and a pelletizer. In addition, a plurality of pressure sensors are provided at several points within the system for measuring the pressure of a flow of molten thermoplastic material therethrough. A microcomputer is coupled to the pressure sensors for determining the pressure sensed by each, the microcomputer further being coupled to a plotter for plotting the pressures. An operator, by observing a rise in the plotted pressures, is enabled to activate a filter changing system in order to replace a clogged filter with a clean filter when the pressure equals a predetermined critical pressure point indicative of a filter being substantially clogged with impurities. Thus, the impurities held by a filter are not dislodged and forced to pass through the filter due to the pressure exceeding the critical pressure point.

13 Claims, 2 Drawing Sheets

METHOD OF REMOVING IMPURITIES FROM A MATERIAL

FIELD OF THE INVENTION

The present invention relates to purification systems and, in particular, to a purification system comprised of one or more in-line filters for filtering impurities from a pressurized stream of material passing therethrough and an in-line pressure measurement system for sensing an increase in pressure due to clogging of the filter or filters with impurities.

BACKGROUND OF THE INVENTION

Purification systems are widely used in a variety of industries for removing impurities from a stream of liquid or gaseous material. Of particular interest to the present application is a purification system for the plastics industry and, in particular, the thermoplastic waste recovery industry wherein it is a desireable goal to recover a purified thermoplastic material from scrap or waste thermoplastic material. Often such waste thermoplastic material contains impurities such as bits of metal or soil or other organic or inorganic debris which must be removed in order to produce the purified thermoplastic material.

A problem is created when the recovered material must have a particularly high degree of purity in order to be of commercial value. One such material is polypropylene. Examples of other types of thermoplastic materials are nylon, PVC and polyester.

Typically, purified polypropylene reclaimed from distressed, or waste, polypropylene is mixed with virgin polypropylene. The mixture may then be further processed to produce fibers or filaments having desireable stretch and other characteristics. If, however, the reclaimed polypropylene is of less than a given degree of purity, the reclaimed material when added to virgin polypropylene will not yield a fiber having the desired characteristics.

A process for reclaiming polypropylene typically includes heating the distressed material to above the melting point of polypropylene (approximately 340° F.) and then extruding the melted material under pressure through a filter or filters to remove impurities. The filtered material may then be passed through a pelletizer to produce pellets of essentially pure polypropylene. Alternatively, the filtered material may be passed through other devices to produce, for example, filaments, sheets or films of polypropylene.

As may be appreciated, the purity of such pellets is to a large degree dependent on the effectiveness of the filter or filters. If the filters become clogged with filtrate, such as inorganic matter or gel, the flow of polypropylene from the extruder is reduced, resulting in an increase in pressure. Such an increase in pressure is often detrimental in that at a certain critical pressure point some of the filtrate may be forced to pass through the filter, resulting in the production of polypropylene pellets of less than the desired grade of purity. Thus, it is essential that the filter or filters be removed and replaced with clean filters at or just before the critical pressure point in order to produce purified pellets in a consistent and continuous manner.

It is therefore an object of the present invention to provide a purification system which allows for the consistent and continuous production of a purified material.

It is a further object of the present invention to provide a purification system wherein an increase in pressure due to the clogging of a filter with impurities is detected such that the clogged filter may be replaced with a clean filter.

It is a further object of the present invention to provide a purification system wherein an increase in pressure due to the clogging of the filter is detected such that the clogged filter may be replaced before the filtrate trapped therein is forced through the filter due to the increase in pressure beyond the critical pressure point.

It is a further object of the present invention to provide a purification system for producing in a consistent and continuous manner thermoplastic material, such as polypropylene, having a high degree of purity.

It is a still further object of the present invention to provide a method of determining the optimum time at which a filter within a purification system need be replaced, the method of determining being accomplished in part by monitoring an increase in pressure within the system due to the clogging of the filter with impurities.

SUMMARY OF THE INVENTION

The aforementioned aspects and other features of the invention are attained by a purification system and method which, in accordance with the invention, is comprised of one or more pressure sensors for sensing an increase in pressure due to the clogging of a filter, the clogging of the filter being due to the filter removing impurities from a stream of pressurized material passing therethrough.

In a preferred embodiment pressure sensors are operably connected to a pressure measuring system having a plotter for plotting the measured pressures whereby an operator may determine the optimum time for replacing a clogged filter with a clean filter, the optimum time being a time at which the pressure rises to a predetermined critical pressure point. The critical pressure point is a pressure at which the filtrate of impurities retained by the filter begins to be dislodged and forced to pass through the filter.

In an illustrative embodiment a waste recovery system for the purification of polypropylene from distressed polypropylene is disclosed. The waste recovery system is comprised of an extruder for melting and pumping under pressure a flow of polypropylene and the unmelted impurities contained therein. The flow of polypropylene is passed through a primary filter to obtain a filtered flow of polypropylene. The filtered flow is further passed through a secondary filter to obtain a doubly filtered flow of essentially pure polypropylene which is subsequently cooled and pelletized.

A first pressure sensor is disposed between the extruder and the primary filter for sensing the pressure of the flow, a second pressure sensor is disposed between the primary and secondary filters for sensing the pressure of the filtered flow. A third pressure sensor is disposed between the secondary filter and a pelletizer for sensing the pressure of the doubly filtered flow, which pressure remains essentially constant and provides a baseline pressure for the pressures measured by the first and second pressure sensors. In the illustrative embodiment the pressure measuring system is comprised of a microcomputer operably coupled to a plotter whereby the pressure signals from each of the pressure sensors are converted to a digital form and subsequently plotted. An operator, by observing the magnitude and slope of the plotted pressures, may determine the time at which a particular filter becomes clogged, the operator thereafter activating a hydraulically operated two stage filter system to rapidly replace the clogged filter with a clean auxiliary filter. Thus the filters are rapidly changed before the pressure rises beyond the critical pressure point, and hence before the filtrate of impurities is dislodged from a filter to contaminate the filtered flow or the doubly filtered flow of polypropylene.

BRIEF DESCRIPTION OF THE DRAWINGS

The foregoing aspects and other features of the invention are explained in the following description, when taken in connection with the accompanying drawing wherein.

DETAILED DESCRIPTION OF THE INVENTION

Figure 1:
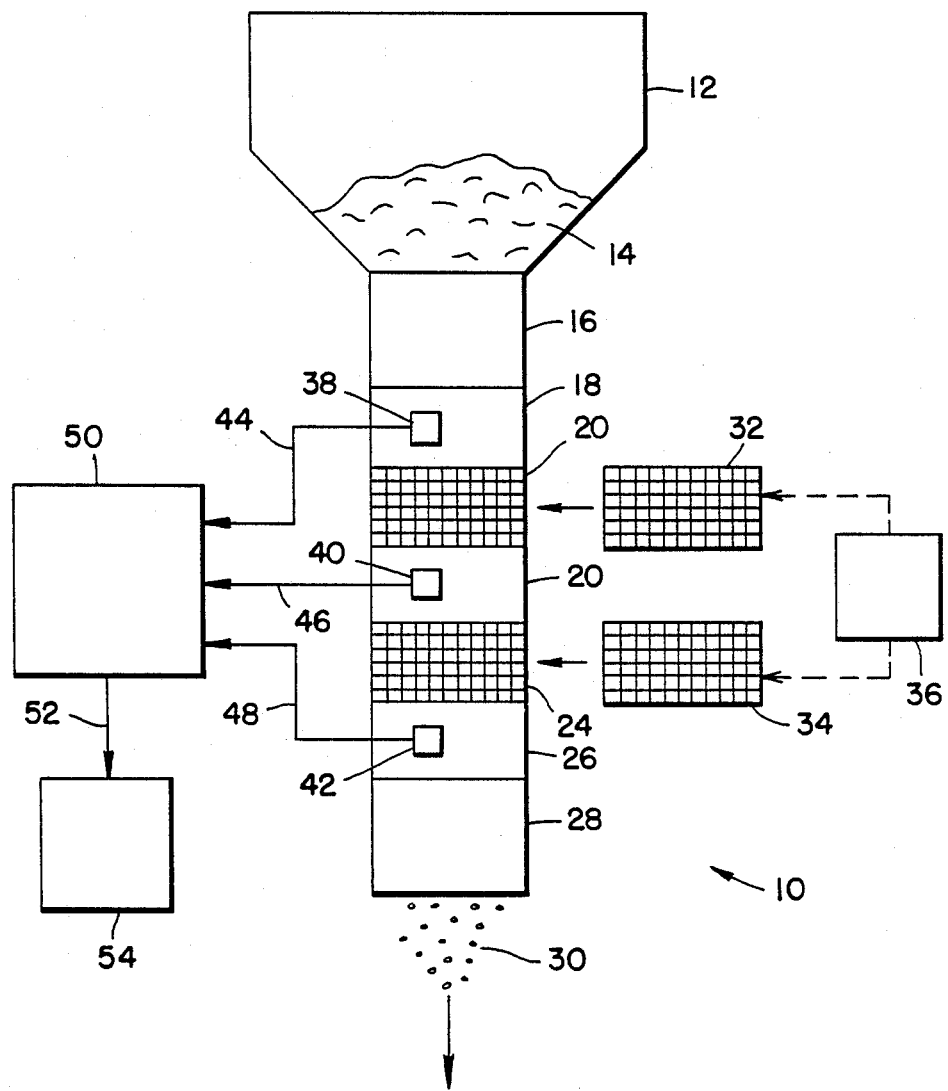
FIG. 1 is a block diagram of a polypropylene purification system having a filtration system constructed in accordance with the invention.

With reference to FIG. 1 there is shown a portion of a purification system 10 for the reclamation of polypropylene from distressed polypropylene having an embodiment of the filtration system of the invention. Although the invention will herein be described in the context of a polypropylene reclamation system it should be realized that the use of the invention may be advantageously employed in purification systems for other types of thermoplastics, such as nylon. Likewise, it should be realized that the use of the invention extends beyond such thermoplastic purification systems and its use may further be advantageously employed in liquid or gas purification systems wherein it is desireable to determine an optimum time at which to change a filter or filters which have become clogged with filtrate.

Purification system 10 is comprised of a hopper 12 containing a quantity of distressed polypropylene 14. Connected to hopper 12 is an extruder 16 which receives the distressed polypropylene 14 therefrom. Extruder 16 melts the distressed polypropylene 14 by heating it to approximately 400° F., a temperature above the melting point of polypropylene but below that of substantially all of the impurities contained therein. The extruder 16 further pumps the melted material under pressure such that the material flows through an extruder/filter adapter 18, a primary filter 20, a primary filter/secondary filter adapter 22, a secondary filter 24, a filter/pelletizer adapter 26 and a pelletizer 28 where pellets 30 of essentially pure polypropylene are produced. In the embodiment as shown filter 20 serves as a primary filter and filter 24 as a backup or secondary filter for filtering unmelted impurities from the flow of molten polypropylene passing therethrough. Filters 20 and 24 may be constructed of stainless steel screen material of 325 mesh, thereby having an opening size of 30 to 40 microns. It should be realized that in other unillustrated embodiments of the invention that more or less than two filters may be employed. The choice of the number and types of filters is typically determined by the nature of the material being filtered, the desired grade of purity of the final product, and other application specific parameters.

Figures 2, 3, 4:
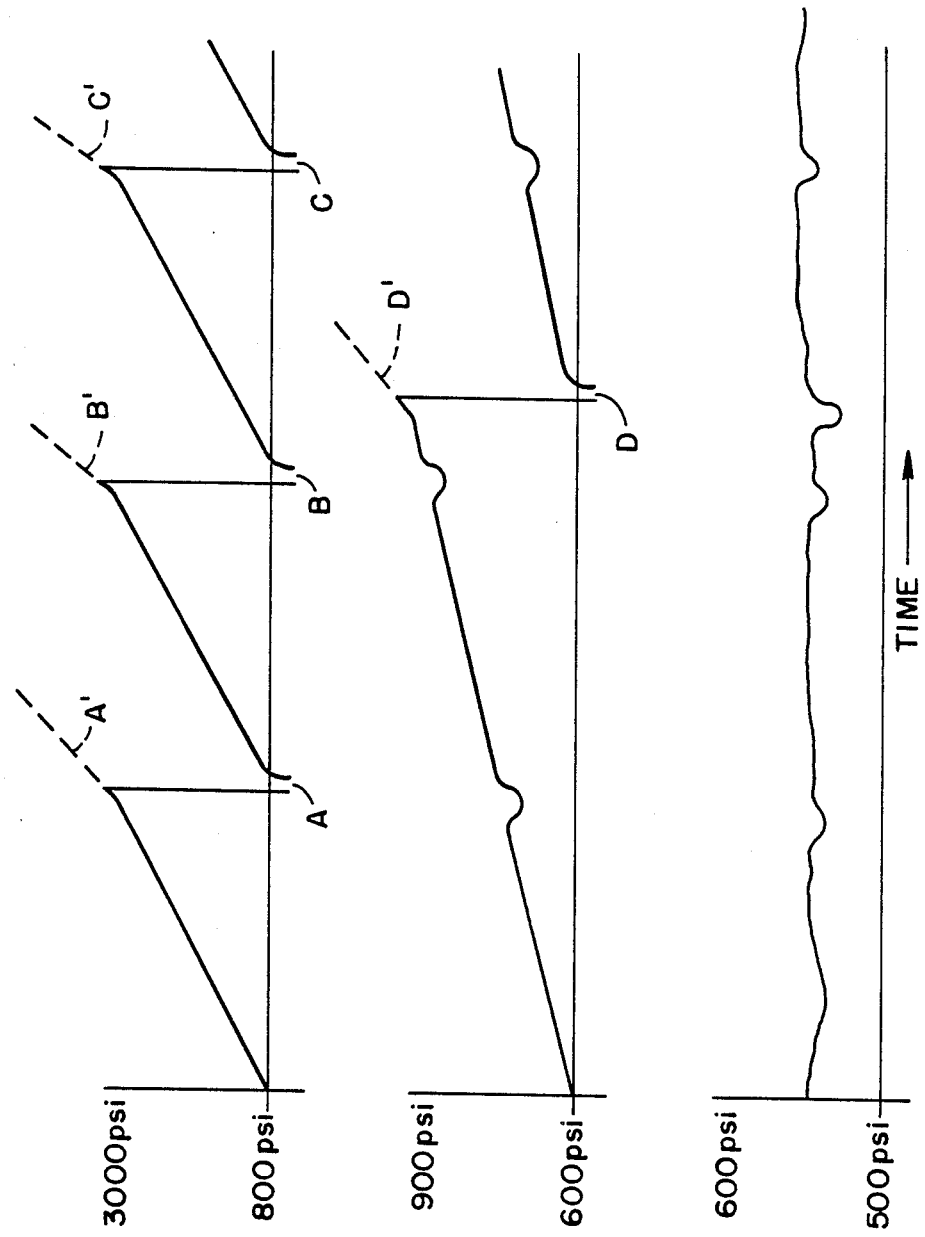
FIGS. 2, 3 and 4 are graphs which show a change in pressure over time at various points within the purification system of FIG. 1.

In operation, when primary filter 20 is clean the molten stream of polypropylene will flow towards and through the filter 20 at a temperature of approximately 400° F. and a pressure of approximately 800 psi. However, as filter 20 begins to filter impurities from the stream the openings within filter 20 will begin to clog with the impurities, thereby reducing the flow and increasing the pressure. As seen in FIG. 2, the pressure has been found to gradually increase at, typically, an approximately 30 degree slope until the pressure reaches approximately 3000 psi. At this elevated pressure some of the smaller particles deposited in the filter are dislodged and are forced to pass through the filter 20, thereby defeating the purpose of the filter. The pressure at which the particles are dislodged from the filter is referred to herein as the critical pressure point, or critical point, for the filter. It is noted that the graphs shown in FIG. 2, and FIGS. 3 and 4, are only representative and are not necessarily to scale.

It has also been found that at or near the critical point the rate of rise of the slope of the pressure curve abruptly changes from, typically, approximately 30 degrees to approximately 40 degrees. Thus, it may be realized that such a change in the slope of the pressure curve is further indicative of the critical point for filter 20 being reached. At a time that the critical point is reached it is necessary, in order to maintain a given purity of the pellets 30, to replace the clogged filter with a clean filter.

Typically, such a filter change is accomplished by utilizing a two stage filter which may be rapidly changed by means of a hydraulically actuated filter controller. Referring to FIG. 1 it can be seen that both filter 20 and filter 24 have an auxiliary filter, 32 and 34 respectively, associated therewith. A filter controller 36 is operable to rapidly replace either filter 20 or 24 with the corresponding auxiliary filter 32 or 34, respectively. The clogged filter which is so removed from service is typically cleaned so that it will be ready for reuse when the auxiliary filter becomes clogged.

In accordance with the invention, the critical pressure point for filter 20 is detected by a pressure measuring means, which in the illustrative embodiment is comprised of a first pressure sensor 38. A second pressure sensor 40 is operable for detecting the critical point for filter 24. A third pressure sensor 42 senses a substantially constant pressure and is used to determine a reference or baseline pressure for sensors 38 and 40. As can be seen, sensor 38 is disposed upstream from the filter 20 within the extruder/filter adapter 18. Sensor 40 is disposed within adapter 22 between the filters 20 and 24 and sensor 42 is disposed downstream of filter 24 within the filter/extruder adapter 26. Each sensor 38, 40 and 42 has a corresponding sensor conductor 44, 46 and 48, respectively, for coupling the sensor output signal to a sensor receiving device, which may be a microcomputer 50. Suitable pressure sensors which may be utilized for the sensors 38, 40 and 42 are model numbers TD10 and TD20 Pressure Transducers, manufactured by the Barbe Coleman Company, Loves Park, IL.

Typically, such a microcomputer 50 is comprised of a microprocessor (not shown) and circuitry (not shown) operable for converting each sensor output signal, which may be a direct or alternating current, to a digital format suitable for being inputted to the microprocessor. Such circuitry, which is well known, may be an analog-to-digital converter.

Microcomputer 50 has a plotter drive output 52 coupled to a plotter 54 whereby a graph of the pressure measured by each pressure sensor may be plotted. Such a pressure graph may then be examined by an operator in order to determine when a particular filter has reached the critical point so that the operator may activate controller 36 to replace the clogged filter with a clean filter. A suitable microcomputer 50 and plotter 54 is the model number KMR 3 Microprocessor Circular Chart Recorder, manufactured by the Barber Coleman Company.

Referring now to FIGS. 2, 3 and 4 there are shown illustrative pressure profile graphs, which graphs are similar to what would be produced by plotter 54 during the operation of the system 10.

The graph of FIG. 2 corresponds to the pressure measured by sensor 38 at an upstream position from primary filter 20. As may be seen, the pressure is initially at 800 psi, which pressure is indicative of the primary filter being clean. As primary filter 20 filters impurities from the stream of molten polypropylene it gradually becomes clogged with impurities, thereby reducing the flow therethrough and increasing the pressure sensed by sensor 38. When the pressure reaches approximately 3000 psi, the slope of the pressure profile abruptly changes to a steeper slope, indicated by the dotted extensions A', B' and C' of the plotted pressure profile. These changes in slope correspond to the critical pressure point for filter 20, that is, the point where a portion of the impurities retained by filter 20 are forced through the filter. To prevent such contamination of the filtered flow downstream of filter 20 the filter is replaced with the clean auxiliary primary filter 32 by the activation of two stage filter controller 36. Such a filter change occurs in a rapid manner, typically within two seconds or less. The result of replacing the clogged filter is a sudden drop in pressure, indicated by the points A, B and C of FIG. 2, followed by a rapid increase in pressure due to the initially empty filter becoming filled with molten polypropylene. As can be seen, the pressure is rapidly reestablished at 800 psi, and the filtering process continues. In practice, the optimum time at which to change a filter is dependent on the desired grade of purity of the final product, the nature of the impurities being filtered out of the molten material, and other application specific parameters. The magnitude and rate of change of pressure, as determined by the use of the invention, aids in the determination of such an optimum time.

FIG. 3 shows the pressure measured by sensor 40 at a point upstream from filter 24. Filter 24 may be of the same or a finer mesh than filter 20 for filtering the filtered flow to produce a doubly filtered flow of essentially pure polypropylene. As can be seen, filter 24 has a characteristic pressure profile which increases at an essentialy constant slope until the critical pressure point for filter 24 is reached, at which time the slope increases as indicated by the dotted extension D'. At the critical pressure point filter 24 is replaced with auxiliary filter 34, resulting in a rapid drop in pressure, as indicated by D, and a subsequent reestablishment of the pressure at approximately 600 psi.

The graph of FIG. 4 is illustrative of the pressure sensed by sensor 42 at a point downstream of filter 24 and upstream from pelletizer 28. As can be seen, the pressure sensed is essentially a constant pressure except for the disturbances caused by the rapid pressure drops due to the changing of the upstream filters. The pressure profile of FIG. 4 may be plotted as shown, thereby permitting the operator to observe this pressure in conjunction with the pressure profiles of FIGS. 2 and 3.

The pressure signal output from sensor 42 may also be combined by microcomputer 50 with the pressure signals from sensors 38 and 40 to obtain plotted pressure profiles having a baseline correction determined by the pressure sensed by sensor 42.

In accordance with the invention, a surge vessel (not shown) may be connected upstream from the pelletizer 28 if the pelletizer is of the type sensitive to pressure disturbances, such as those caused by the changing of filters 20 and 24. Such a surge vessel provides for maintaining an essentially constant input pressure to the pelletizer. The surge vessel may also be required if some other pressure sensitive device, other than a pelletizer, is disposed to receive the purified polypropylene.

It may be further realized that the specific operating pressures and rate of change of pressures, as well as the critical pressure point for a particular filter, are greatly influenced by a variety of factors, such as the physical nature of the material being purified, the amount and type of impurities contained therein, the mesh size of the filters, and the size and type of extruder utilized. Therefore it should be appreciated that the pressures and rate of change of pressures described herein in reference to the illustrative embodiment are not to be construed as limiting the use of the invention to specific pressures or pressure ranges.

It should be noted that the microcomputer 50 in other, unillustrated, embodiments of the invention may have output signals coupled to filter controller 36. In such a system microcomputer 50 would be suitably programmed to energize such output signals in order to directly activate filter controller 36 when a measured pressure exceeds the predetermined critical pressure point for a given filter. Thus, control of the system 10 may be made substantially fully automatic.

As may be appreciated from the foregoing description the use of the invention may prove advantageous in other than a waste recovery system for producing purified polypropylene. For example, the use of the invention may prove advantageous in waste recovery systems for other types of thermoplastics, such as nylon. The use of the invention is further advantageous for other than thermoplastic waste recovery systems, such as purification systems used during the initial production of such thermoplastics. The invention may also be employed in the purification of other types of fluids or even gasses, such as water purification systems or systems for producing purified gases, such as gases utilized in medical or experimental applications. Of course, in each different type of application it is necessary to determine the critical pressure point for the filter type used therein, the critical point being influenced by such factors as the pressure within the system, the mesh size of the filter, the viscosity of the fluid, and other such application specific parameters. Thus, it should be seen that the use of the invention is not limited to a waste recovery and purification system for polypropylene.

What is claimed is:

1. A method of removing impurities from a material comprising the steps of:
    pressurizing the material;
    filtering the pressurized material with a filter such that the impurities are retained in the filter;
    measuring a rate of pressure rise of the pressurized material in order to determine the time that the pressure reaches a predetermined critical pressure point indicative of the filter being substantially clogged; and providing a clean filter at a time related to the time that the pressure reaches said predetermined critical pressure point whereby the impurities retained in the substantially clogged filter are not forced to pass through the filter due to a further pressure rise causing the pressure to exceed the predetermined critical pressure point.

2. A method in accordance with claim 1 wherein the step of pressurizing further comprises the steps of:

heating the material to a temperature such that the material is melted but the impurities are not melted; and pumping the melted material containing the impurities whereby the melted material is pressurized.

3. A method of removing impurities from thermoplastic material comprising the steps of:

extruding the thermoplastic material in a melted state and at an initial pressure;

filtering the extruded thermoplastic material with a filter such that the impurities are retained by the filter;

measuring a rate of rise in pressure of the extruded material in order to determine the time at which the pressure reaches a predetermined critical pressure point indicative of the filter being substantially clogged with impurities; and providing a clean filter at a time related to the time that the pressure reaches said predetermined critical pressure point whereby the impurities are not forced to pass through the filter due to a further rise in pressure causing the pressure to exceed the predetermined critical pressure point.

4. A method of removing impurities from polypropylene to produce essentially pure polypropylene comprising the steps of:

heating the polypropylene to a temperature such that the polypropylene is melted but the impurities are not melted;

extruding the polypropylene to provide a flow of polypropylene under pressure;

filtering the flow of polypropylene with a filter to produce a filtered flow of substantially pure polypropylene and a gradually increasing quantity of a filtrate of impurities at the filter;

measuring the rate of rise of a pressure of the flow during the step of filtering;

observing the measured rate of rise of the pressure of the flow to determine the time at which the pressure of the flow increases to a predetermined critical pressure point indicative of the filter being substantially clogged with impurities; and providing a clean filter at a time related to the time that the pressure of the flow reaches said predetermined critical pressure point whereby the filtrate is not forced to pass through the substantially clogged filter and into the filtered flow due to a further rise in pressure causing the pressure to exceed the predetermined critical pressure point.

5. A method in accordance with claim 4 wherein the step of providing is accomplished by activating a two stage filter system to replace the substantially clogged filter with a clean filter.

6. A method in accordance with claim 4 further comprising the steps of:

further filtering the filtered flow of polypropylene with a secondary filter to produce a doubly filtered flow of essentially pure polypropylene and a gradually increasing quantity of a filtrate of impurities retained at the secondary filter;

measuring the rate of rise of a pressure of the filtered flow during the step of further filtering;

observing the measured rate of rise of the pressure of the filtered flow to determine the time at which the pressure of the filtered flow increases to a second predetermined critical pressure point indicative of the secondary filter being substantially clogged with impurities; and providing a clean secondary filter at a time related to the time that the pressure of the filtered flow reaches said second predetermined critical pressure point whereby the filtrate is not forced to pass through the substantially clogged secondary filter and into the doubly filtered flow due to a further rise in pressure causing the pressure to exceed the second predetermined critical pressure point.

7. A method in accordance with claim 6 wherein the step of providing a clean secondary filter is accomplished by activating a two stage filter system to replace the substantially clogged secondary filter with a clean secondary filter.

8. A method according to claim 6 further comprising the steps of:

measuring the pressure of the doubly filtered flow to obtain a baseline pressure; and observing the measured baseline pressure whereby the step of observing the measured rate of rise of the pressure of the flow and the step of observing the measured rate of rise of the pressure of the filtered flow are facilitated.

9. A method according to claim 8 wherein the steps of observing are accomplished by observing the output of a plotter operable for plotting the measured rate of rise of the pressures.

10. A method according to claim 9 wherein the steps of measuring are accomplished by a microcomputer, the microcomputer being operable for driving the plotter for plotting the measured rate of rise of the pressures.

11. A method as defined in claim 8 wherein the steps of measuring, the steps of observing and the steps of providing are accomplished by a microcomputer means.

12. A method in accordance with claim 6 further comprising the step of pelletizing the doubly filtered flow to produce pellets of essentially pure polypropylene.

13. A method as defined in claim 6 wherein the steps of measuring, the steps of observing and the steps of providing are accomplished by a microcomputer means.

* * * * *